UNITED STATES PATENT OFFICE.

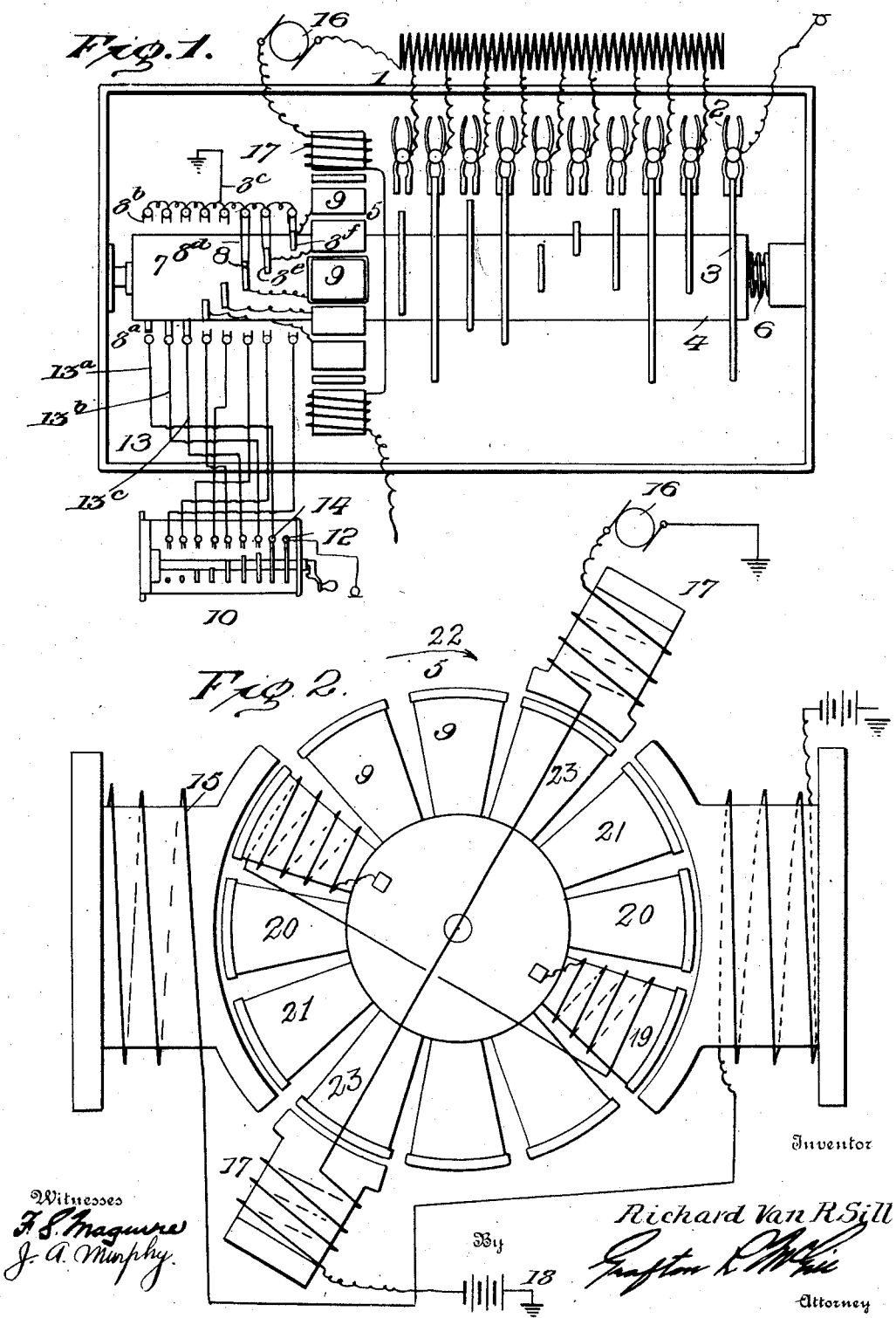

RICHARD VAN R. SILL, OF NEWARK, NEW JERSEY, ASSIGNOR OF TWO-THIRDS TO ALPHONZO E. PELHAM, OF NEW YORK, N. Y.

ELECTRIC CONTROLLER.

1,030,617.     Specification of Letters Patent.     Patented June 25, 1912.

Application filed September 5, 1907, Serial No. 391,474. Renewed October 6, 1910. Serial No. 585,706.

*To all whom it may concern:*

Be it known that I, RICHARD VAN R. SILL, of Newark, in the county of Essex and State of New Jersey, have invented certain new and useful Improvements in Electric Controllers; and I do hereby declare the following to be a full, clear, and exact description of the invention, such as will enable others skilled in the art to which it appertains to make and use the same.

This invention contemplates an improved electric circuit controlling mechanism having especial reference to the pilot motor by which a controller drum is operated.

One of the objects of the invention is to provide improved means for connecting the motor with a master switch so as to insure the step by step movement of the motor in synchronism with the master switch.

A further object of the invention is to provide means for automatically regulating or reversing the movement of the pilot motor in the event of careless operation or an overload upon the power motor.

In the accompanying drawing I have illustrated the invention as adapted to a controller drum or cylinder through which current may be fed to a power motor, but in railway or plant equipment other forms of contacts may be used.

Figure 1 is a diagram of the controller and auxiliary parts and Fig. 2 is a detail view of the pilot motor.

Referring to the drawing, 1 designates a controller cylinder shown equipped with fingers 2 adapted to engage contact plates 3 carried by the drum 4. The drum is secured to, and rotatable with, the rotary member or armature of the electro magnetic pilot motor 5. By means of a spring 6 the drum may be retracted when the pilot motor is deënergized.

The motor 5 is of peculiar construction. As shown in Fig. 2 its rotary member or armature comprises a series of sectional windings 9 the opposite pairs of which are connected in circuit. Each of the coils or sectional windings is independently connected with a contact surface of the master switch 10. As illustrated in Fig. 1 these connections are established by providing the commutator 7 of the motor with a series of sections 8 preferably in staggered arrangement and connecting each of these commutator sections with one of the armature coils or sectional windings 9. The sections 8 are designed to successively engage brushes 8ª and each of the latter is separately and successively connected by leads 13 with successive contacts 14 of the master switch 10 to which current is supplied from a trolley or third rail by a conductor 12. A second series of brushes 8ᵇ is also engaged by the commutator sections, and these brushes are connected by a grounded wire 8ᶜ.

From the foregoing it follows that as successive contacts are made in the operation of the master switch the current entering at 12 will flow through each of the contacts 14 successively, its respective lead 13, brush 8ª, commutator section 8, coil 9, and brush 8ᵇ to ground, thus progressively shifting the polarity of the armature of the motor.

At 15 I have shown constant operating fields or magnets which may be energized from any suitable source. This energy is not essential to the normal operation of the motor, however, since if only steel or other magnetic metal poles be used the energized coils 9 will be attracted to them. The power motor to which current is supplied through the controller is indicated at 16.

The operation resulting from the construction thus far described will be apparent. The steps of the pilot motor and controller drum are synchronized with those of the master switch; the current is normally retained in the motor at all times and it is the only influence governing the motor. If the current should be interrupted the armature is free to return to the starting point under the tension of spring 6. When the motor is started by sending the current through the first contact surface 14 of the master switch, lead 13ª, its brush 8ª, section 8 and winding 9, coil 19, Fig. 2, will center at the constant magnet. This partial rotation of the armature compresses spring 6 and if the operator should cut off the current from coil 19 the spring would retract the controller drum. The same will be true when the succeeding coil 20 is also energized through its respective section 8 and brush and lead 13ᵇ, the two coils tending to center at the constant poles. When coil 21 is also energized through lead 13ᶜ, and the three energized coils are under the influence of the constant magnets, then if the operator shifts the master switch one notch off and deënergizes coil 21, coils 20 and 19 will seek the center of the constant poles and a partial reverse rotation of the armature and drum will result. So, also, if the operator, instead of cutting out only the one coil 21, should cut out both coils 20 and 21, coil 19 will seek the center of the constant poles, resulting in a further reverse rotation of the armature and drum. Hence I have shown in Fig. 1 the circuits through leads 13ᵃ, 13ᵇ and 13ᶜ completed through sections 8ᵈ, 8ᵉ and 8ᶠ, respectively, the corresponding three coils being simultaneously excited for the purpose above stated. Coil 19 will necessarily be deenergized to permit coil 23 to advance. Contingencies may arise, however, in which the manual control will supply too much current to the power motor or in which an overload upon the power motor will occur by a short circuit. My invention provides for these situations. In the form illustrated a pair of governing magnets 17 are used. These are shown equipped with windings in series with the armature of the power motor 16 and connected to a battery 18. In order for the pilot motor to rotate in the "on" direction it is necessary that the attraction of the coils 9 to the poles 15 shall be greater than that of the coils to the governing magnets 17. When this condition exists the coils 19, 20, 21, etc., will be successively drawn toward the poles 15 and the armature will rotate in the direction of the arrow 22, the influence of the magnets 17 not being sufficient to retard the rotation of the armature. If, however, too much current be supplied to the power motor 16 so that the strength of the governor fields 17 equals the attraction of the coils to the constant magnets 15, then these governor fields which are in series with the armature of the power motor, will attract the coil 23 (in the position shown in Fig. 2) and will arrest the rotion of the pilot motor. If the strength of the governing magnets 17 be still further increased, as will result from an overload upon the power motor, then the three coils which are energized at the time, 19, 20, 21 for instance, will tend to center toward the governing magnets, resulting in reversing the direction of rotation of the pilot motor and the controller drum and in consequence cutting down the current to the power motor.

Among the many advantages of my invention it may be noted that I am enabled to entirely dispense with solenoids and mechanical brakes. The connections of the coils 9 of the pilot motor with the master switch insure absolute synchronism of movement, while the governing magnets render it unimportant what kind of master switch may be employed since if only a simple starting device were used by which the line current was admitted through all the leads 13 at once, the pilot motor would move to the "on" position step by step, retarded by the series current of the power motor energizing the governing magnets. Hence if in operation the flow should be interrupted and the controller returned to the starting point but the operator should fail to shut off the master switch, a sudden resumption of current could not cause the pilot motor to suddenly fly back to its former position in synchronism with the master switch as the pilot motor is, by reason of the governing magnets, incapable of any but a gradual step by step movement.

I am aware that it is not new to provide a stationary magnetic field consisting of a series of sectional windings each separately connected with the contact surfaces of a starting switch but I am not aware of a motor having been provided with a rotary element or armature of that construction and electrical connection.

I am also aware that prior to my invention electric controllers have been known in which the armature of a relay motor is under the influence of two fields, one on a shunt of the power line and the other in series with a power motor, the shunt field being energized by closing a starting switch and tending to turn the armature to cut out the resistance and the series field exerting a retarding force. While this construction is, or may be, capable of effecting a gradual and successive cutting out of the resistance in the line to a power motor, yet it is incapable of attaining the essential purpose contemplated by my invention, namely, the limiting of the steps of the controller at the will of the operator. This is owing to the fact that in the practical embodiment of the known controller above outlined the closing of the starting switch energizes the shunt field and starts the controller which must necessarily continue its steps automatically, only retarded from too rapid rotation by the series field, until the resistance has been entirely cut out. If, however, for any reason it be desired to hold the controller temporarily or permanently at any intermediate point, or in other words to limit the action at the will of an operator, this known construction will be found inadequate for the reason that the opening of the starting switch will immediately and completely deenergize the shunt coil and thus the latter will exert no force tending to move the controller, while the series coil will reverse the rotation of the armature and throw the controller back to the starting point. By my invention the energy of fields 15 does not alone cause the controller to move as it is entirely dependent upon the operation of the master switch and this may be turned to any desired extent and held at any point. The steps of the controller are thus synchronized with those of the master switch. If, however, the operator suddenly throws the master switch to the full position then the rise of energy in the governing magnets or series field 17 will retard the rotation of the controller armature, retaining the resistance and consequently lessening the current passing to the power motor 16 until it falls below the attraction of coils 9 to the constant fields 15 after which the latter will exert their influence upon the energized coils to turn the controller armature when the master switch is operated. Thus I not only render the controller movement subject to the intelligence of an operator, but provide a safeguard against careless operation.

I claim as my invention:—

1. A circuit controlling mechanism comprising a pilot motor having permanent fields and a rotary armature, sectional windings upon said armature, a master switch, and independent electric connections between successive sections of said windings and successive contact surfaces on said master switch, whereby the polarity of the armature may be progressively shifted as the master switch is operated.

2. A circuit controlling mechanism comprising a pilot motor having sectional windings upon its rotary member or armature, and having commutator sections each separately connected to one section of the windings, a master switch, and independent conductors for connecting the successive contacts on the master switch with successive commutator sections.

3. The combination with a power motor and a controller therefor, of a pilot motor for operating the controller, said pilot motor having sectional windings and having a series of commutator sections connected, respectively, to said windings, a series of contact brushes adapted to be engaged successively by said commutator sections as the pilot motor rotates, and a master switch arranged to connect said brushes successively with the supply circuit.

4. A circuit controlling mechanism comprising a pilot motor having sectional windings and having commutator sections each separately connected to one section of said windings, brushes or contacts adapted to engage said commutator sections in succession as the motor rotates, a master switch, and electrical connections between said brushes or contacts and said master switch.

5. A circuit controlling mechanism comprising a pilot motor having sectional windings upon its rotary member or armature and having commutator sections each separately connected to one section of the windings, brushes or contacts adapted to engage said commutator sections in succession as the motor rotates, a master switch, and electrical connections between said brushes or contacts and said master switch.

6. The combination with a power motor and a controller therefor, of a pilot motor for operating the controller, said pilot motor having sectional windings and having a series of commutator sections each connected to a separate section of the windings, a series of contact brushes adapted to be engaged successively by said commutator sections as the pilot motor rotates, means for connecting said brushes to the supply circuit, and means controlled by the current in the armature circuit of the power motor for governing the movement of the pilot motor.

7. The combination with a power motor and a controller therefor, of a pilot motor for operating the controller, said pilot motor having sectional windings and having a series of commutator sections each connected to a separate section of the windings, a series of contact brushes adapted to be engaged successively by said commutator sections as the pilot motor rotates, means for connecting said brushes to the supply circuit, and a governor field for said pilot motor having windings in series with the armature of the power motor.

8. Means for controlling the transmission of electric power comprising a controller, a pilot motor for operating said controller, a master switch, electrical connections between the master switch and the pilot motor, whereby the latter may move step by step in accordance with the movement of the master switch, and a governor field for said pilot motor energized by the current passing through said controller.

9. The combination with a power motor and a controller for the same, of a pilot motor operatively connected to said controller, said pilot motor comprising stationary and movable members one of which is provided with sectional windings, a master switch, electrical connections between said sectional windings and said master switch, and means controlled by the current in the armature circuit of the power motor for regulating the movement of the pilot motor.

10. The combination with a power motor and a controller for the same, of a pilot motor operatively connected to said controller, said pilot motor comprising stationary and movable members one of which is provided with sectional windings, a master switch, electrical connections between said sectional windings and said master switch, and means for regulating the movement of the pilot motor comprising a magnet having windings in series with the armature of the power motor.

11. The combination with a power motor and a controller for the same, of a pilot motor operatively connected to said controller, said pilot motor comprising stationary and rotary members, the latter having sectional windings, a master switch, electrical connections between said master switch and said sectional windings, and means controlled by the current in the armature circuit of the power motor for governing the movements of the pilot motor.

12. The combination with a power motor and a controller for the same, of a pilot motor operatively connected to said controller, said pilot motor comprising stationary and rotary members, the latter having sectional windings, a master switch, electrical connections between said master switch and said sectional windings, and a governing magnet arranged adjacent to said rotary member and having windings in series with the armature of the power motor.

13. The combination with a power motor and a controller therefor of a pilot motor for operating said controller, said pilot motor having sectional windings, a master switch, connections whereby, when the master switch is operated, a progressively shifting field will be produced in the pilot motor and means controlled by the current in the armature circuit of the power motor for governing the movement of the pilot motor and the controller toward the "on" position.

14. The combination with a power motor and a controller therefor, of a pilot motor for operating the controller, said pilot motor having sectional windings and a series of commutator segments connected, respectively, to said windings, a series of contact brushes adapted to be engaged successively by said commutator segments as the pilot motor rotates, a master switch arranged to connect said brushes successively with the supply circuit, and means controlled by the current in the armature circuit of the power motor for governing the movement of the pilot motor.

15. The combination with a power motor and a controller therefor, of a pilot motor for operating the controller, said pilot motor having sectional windings and having a series of commutator segments connected, respectively, to said windings, a series of contact brushes adapted to be engaged successively by said commutator segments as the pilot motor rotates, a master switch arranged to connect said brushes successively with the supply circuit, and a stationary governing field magnet adjacent to the armature of the pilot motor and having windings in series with the armature of the power motor.

16. The combination with a power motor and a controller therefor, of a pilot motor for operating said controller, an operating field for the rotary element of said pilot motor, means for moving said rotary element step by step in the "on" direction under the influence of said operating field, and a governing field deriving its energy from the power motor adapted to exert its influence upon said rotary element and normally of less strength than said operating field, whereby the increase of magnetism of said governing field to that of the operating field will lock said rotary element as against rotation.

17. The combination with a power motor and a controller therefor, of a pilot motor for operating said controller, said pilot motor having sectional windings on its rotary element, an operating field, means for maintaining a plurality of said sectional windings energized simultaneously and under the influence of said operating field, and a governing field adjacent said operating field and controlled by the current in the armature circuit of the power motor, said governing field being normally of less strength than said operating field and tending to attract said energized sectional windings when its magnetism exceeds that of the operating field.

18. The combination with a power motor and a controller therefor, of a pilot motor for operating said controller, said pilot motor having sectional windings on its rotary element, an operating field, means for successively advancing said sectional windings into the influence of said operating field, and a governing field adjacent said rotary element and in advance of said operating field and controlled by the current in the armature circuit of the power motor, whereby said sectional windings successively pass through the influence of said governing field to that of the operating field while the magnetism of the latter is greater than that of said governing field.

19. In a circuit controlling mechanism the combination with the pilot motor having sectional windings on its rotary element, of an operating field, means for successively exciting said sectional windings and simultaneously holding a plurality of said excited sectional windings under the influence of said field and means for cutting out one or more of said sectional windings, whereby the remaining energized winding or windings will center toward said field and partially rotate said rotary element.

20. In a circuit controlling mechanism, the combination with the pilot motor having coils on its armature or rotary element, and having a commutator provided with sections, independent electrical connections between each of said coils and one of said sections, a series of supply brushes adapted to be engaged successively by said commutator sections as the pilot motor rotates, a series of grounded brushes also successively engaged by said commutator sections, said sections being adapted to simultaneously maintain the circuit completed through a plurality of said supply brushes, the corresponding coils and their respective grounded brushes, of a master switch adapted to successively connect said supply brushes with the supply circuit, and an operating field adapted to exert its influence upon said energized coils.

In testimony whereof, I have signed this specification in the presence of two subscribing witnesses.

RICHARD VAN R. SILL.

Witnesses:
ANNIE D. CHENOWETH,
MABEL BARTLETT.